US008625883B2

(12) United States Patent
Marre et al.

(10) Patent No.: US 8,625,883 B2
(45) Date of Patent: Jan. 7, 2014

(54) PROCESS OF CORRECTING AN IMAGE PROVIDED ON A SUPPORT WHICH IS SUBSEQUENTLY SUBMITTED TO A DEFORMATION PROCESS

(75) Inventors: Olivier Marre, Le Molay Littry (FR); Franck Le Pouliquen, Cherbourg (FR)

(73) Assignee: Quadrazis, Cherbourg Octeville (FR)

( * ) Notice: Subject to any disclaimer, the term of this patent is extended or adjusted under 35 U.S.C. 154(b) by 142 days.

(21) Appl. No.: 13/125,179

(22) PCT Filed: Oct. 12, 2009

(86) PCT No.: PCT/EP2009/007321
§ 371 (c)(1),
(2), (4) Date: Aug. 8, 2011

(87) PCT Pub. No.: WO2010/049059
PCT Pub. Date: May 6, 2010

(65) Prior Publication Data
US 2011/0299762 A1    Dec. 8, 2011

(30) Foreign Application Priority Data
Oct. 31, 2008   (EP) .................................... 08291021

(51) Int. Cl.
*G06K 9/00*    (2006.01)
(52) U.S. Cl.
USPC ........................................................ 382/154
(58) Field of Classification Search
USPC .................... 382/154, 180, 209, 215, 216; 345/419–420
See application file for complete search history.

(56) References Cited

U.S. PATENT DOCUMENTS

| 7,298,889 B2 * | 11/2007 | Massen .......................... 382/154 |
| 7,742,633 B2 * | 6/2010 | Huang et al. ................... 382/154 |
| 2006/0104503 A1 | 5/2006 | Huang et al. |
| 2007/0083383 A1 | 4/2007 | Van Bael et al. |

FOREIGN PATENT DOCUMENTS

| EP | 0495285 | 7/1992 |
| FR | 2 870 028 A1 | 11/2005 |
| GB | 2227334 | 7/1990 |
| WO | WO 2007/042237 A1 | 4/2007 |

OTHER PUBLICATIONS

Danick Desjardins et al., "Dense Stereo Range Sensing with Marching Pseudo-Random Patterns", Computer and Robot Vision, 2007, CRV '07, Fourth Canadian Conference NCE on, IEEE, PI, May 1, 2007, pp. 216-226.

(Continued)

*Primary Examiner* — Daniel Mariam
(74) *Attorney, Agent, or Firm* — Alston & Bird LLP

(57) ABSTRACT

The invention relates to a method for adapting a visual representation which subsequently is subjected to a deformation, like in packaging. To be able to take into account the deformations on the visual representation the method comprises the steps of: providing a pattern on a support, wherein the pattern comprises a distribution of codes, which are arranged such that each code is unique, deforming the support with the pattern, taking at least two images of the deformed support under different points of view, and determining a 3D surface model based on the matching of at least one code of the pattern in the at least two images.

20 Claims, 9 Drawing Sheets

(56) References Cited

OTHER PUBLICATIONS

Figure 1A:
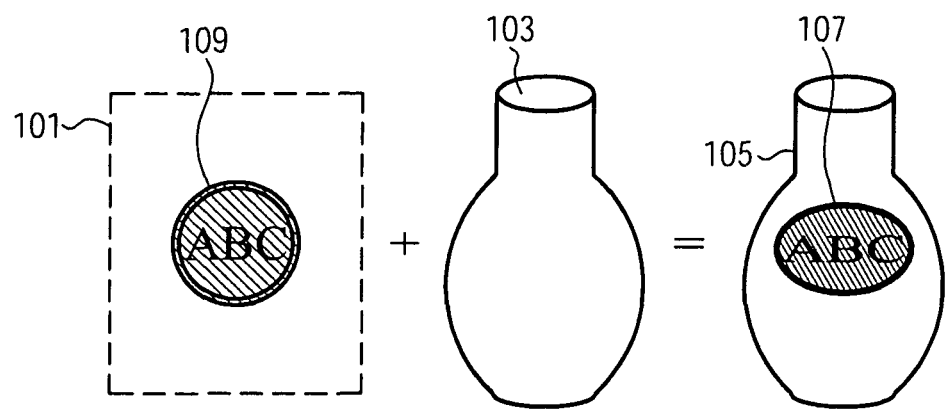

S. Y. Chen et al., "Vision Processing for Realtime 3-D Data Acquisition Based on Coded Structured Light", IEEE Transactions on Image Processing, IEEE Service Center, Piscataway, NJ, US, vol. 17, No. 2, Feb. 1, 2008, pp. 167-176.

Joaquim Salvi et al., "Pattern codification strategies in structured light systems", Pattern Recognition, Elsevier, GB, vol. 37, No. 4, Apr. 1, 2004, pp. 827-849.

Phillip N. Azariadis et al., "On using planar developments to perform texture mapping on arbitrarily curved surfaces", Computers and Graphics, Elsevier, GB, vol. 24, No. 4, Aug. 1, 2000, pp. 539-554.

European Search Report, Application No. 08291021, Sep. 30, 2009.

Office Action for Canadian Application No. 2,471,005 dated Apr. 12, 2013.

* cited by examiner

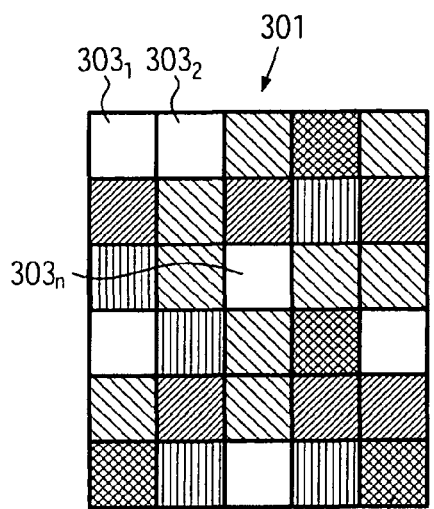
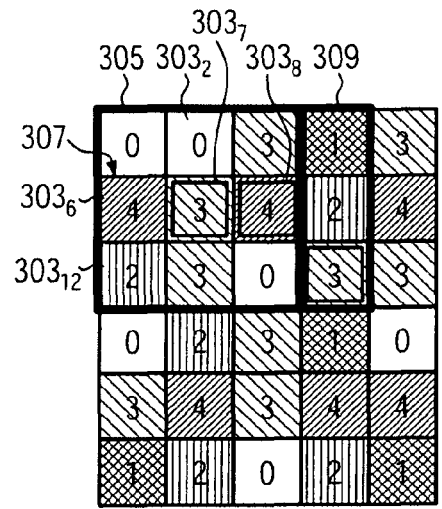
FIG. 3a    FIG. 3b
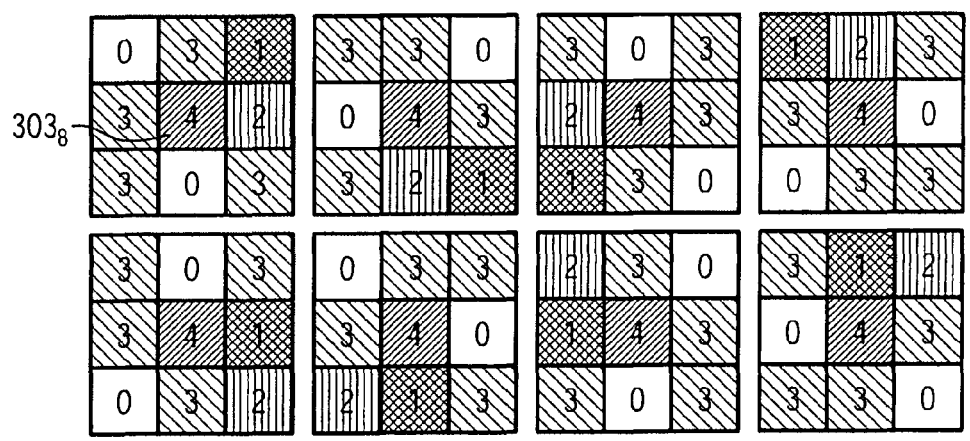
FIG. 3c

PROCESS OF CORRECTING AN IMAGE PROVIDED ON A SUPPORT WHICH IS SUBSEQUENTLY SUBMITTED TO A DEFORMATION PROCESS

The invention relates to a method for adapting a visual representation which subsequently is subjected to a deformation.

In the packaging and conditioning industries, the labelling or packaging processes have a step during which a support, e.g. a foil, with a visual representation is subjected to a deformation step. This situation typically occurs when a two dimensional label is mount on an irregular three dimensional subject, like a bottle, a can or other product containers. Some of these processes comprise a step of shrinking the label onto the object. Other processes deal with stretching of the labels. As usually a visual representation, comprising e.g. drawings, images, text, photographs etc. or a combination thereof, is part of the label, the shrinking and/or stretching leads to an undesired deformation and/or distortion effects on the label. These deformations and/or distortions are highly unwanted. In fact, they negatively influence the aesthetic appearance of a product and the image of the company which fabricates the product and/or the trademark under which the product is put on the market. The same kind of situation also occurs in other fields, like for design products, publicity or marketing products, and actually whenever a visual representation is provided on an object which is subject to a deformation.

Processes have been proposed to take into account these deformations by pre-deforming the visual representations before providing them on the support. It is the intention of these processes to pre-deform such that together with the shrink and/or stretch fabrication step, the desired visual effect is achieved. WO 2007/042237 proposes to create a deformation model based on a simulation of the shrinking process and to adapt the visual representation accordingly. As an alternative WO2007/042237 but also FR 2 870 028 propose to obtain a deformed model based on a measurement of a regular grid which is subjected to the deformation process. Using a 3D scanner tool the x, y, z coordinates of the deformed object are directly measured and used to determine the deformed grid, based on which the visual representation can be pre-deformed.

Whereas the first process needs a profound understanding of the shrinking and/or stretching process, the second kind of process needs special equipment and as a consequence can only be provided by specialized service providers.

It is therefore the object of the present invention to provide a method for adapting a visual representation which is subsequently subjected to a deformation which is simplified, such that a pre-deformation of the visual representation can be carried out without having to know technical details about the deformation process and using less sophisticated hardware. It is a further object of the invention to provide a data analysis method that facilitates the pre-deformation process.

This first object is achieved with the method according to claim 1. The inventive method for adapting a visual representation which is subsequently subjected to a deformation, comprises the steps of: providing a pattern on a support, wherein the pattern comprises a distribution of codes, which are arranged such that each code in the pattern is unique, deforming, in particular plastically, the support with the pattern; taking at least two images of the deformed support under different points of view, and determining a 3D model, in particular a 3D surface model based on the matching of at least one code in the pattern in the at least two images.

According to the invention each code is unique on the pattern, also called texture map, so that the matching of codes between different images is direct. Thus, two images taken from two different angles of view are sufficient to obtain the necessary data using automatic image analysis to determine the 3D surface model which carries all the deformation information. Indeed, it is the provision of a pattern with a distribution of unique codes which provides these advantages. Namely, having identified one code in the image taken, one knows its reference position on the original pattern due to its uniqueness. As a consequence, the method can be applied anywhere, thus without sophisticated hardware like a 3D scanner, by using a camera, like a standard numeric CCD or CMOS camera, and a computer. In addition, no understanding of the deformation process as such is necessary neither, as the analysis is image based.

In this context, unique means that each code is used only once in the pattern. Furthermore, deformation relates to a distortion of the shape so that lengths and/or angles in the original representation are not conserved. Deformation particularly relates to plastic deformations i.e. meaning that the deformation is not reversible, like by a shrinking or stretching process of foils.

Preferably, the pattern can comprise a grid build up by polygons, in particular quadrilaterals, and wherein one code is associated with one polygon, in particular one quadrilateral. Polygons have the advantage that, as a first approximation, they can still be approximated by polygons even after a high deformation due to an industrial process. Thus thanks to the use of polygons, like quadrilaterals, especially when their size is adapted for automatic image analysis, the grid can be identified automatically by e.g. looking for the corners and/or the center of the polygon.

Advantageously, one code can comprise at least one symbol, in particular a colour and/or a texture. The symbol can also be a graphical symbol, like a circle, a star, the plus, the minus sign or the multiplication sign. The term texture can relate to the screening of the image process. By combining various types of symbols the amount of different codes can be increased.

Colours have the advantage that they can be preserved during the deformation and the acquisition process, even if the illumination during step c) varies. Graphical symbol can advantageously be used, if the number of different colours is limited, e.g. due to the industrial process or if the pattern is not big enough to cover the whole product. Also one can take advantage of the screening of the image leading to characteristic textures to identify the colour in an image analysing process. In a printing process, the screening of the image builds up a colour by means of a mixture of base colours (using C.M.Y.K these colours are e.g. Cyan, Magenta, Yellow and/or black). Thus one characteristic texture can be associated with each colour and can thus be used to identify the colour, in particular if the screening of the image provides one kind of texture per colour.

Preferably, each code can comprise its symbol and the symbols of a predetermined number of neighbouring codes. By doing so the number of available unique variants for one code can be raised without having to provide more symbols, which could render the image analysis more demanding. In the case a polygon of the pattern is associated with one code and a colour is used as a symbol, this code is then composed of its colour and the colours of the neighbouring polygons. In case of a quadrilateral one can take the four next nearest neighbours or the eight connected quadrilaterals which are arranged around one central quadrilateral (thus the 4 nearest and 4 next nearest neighbours), or even the nearest 24 neighbours (corresponding to two circles around one central code). To build a code for one polygon P, the colours are preferably taken from connected polygons around polygon P in an ordered way, e.g. the clockwise order. Later on during image analysis the same ordered way is used to determine a code.

Advantageously, each unique code can be invariant in rotation. This property guaranties that all the rotated representations of the quadrilaterals around one central code relate to the same code and only one of them is actually used in the pattern. Thus, visible codes can be extracted independently of the global camera orientation and position, and as a consequence the images in step c) can be taken from any positions.

According to a preferred embodiment, the colour of a code is chosen out of a predetermined number of colours, in particular out of five colours. When taking into account a predetermined number of neighbouring codes, in particular it's eight nearest in the case of quadrilaterals, and with 5 different colours, 244140 (($5^9$)/8) possible rotationally invariant codes exist and it is possible to create a pattern with 256*256 unique codes.

Preferably, intersection lines between the polygons can have a colour different to the one of the codes. This facilitates the image analysis.

According to a preferred embodiment, the pattern is a predetermined pattern and its size is adapted to the size of the support by scaling (that is enlarging or scaling down) and/or cutting the pattern or by adding graphical symbols with colours. Thus with such a pattern, it is possible to deal with any size and form of the support in so far as the codes remain sufficiently large to be detectable through automatic image analysis.

Preferably, in case of repeating the pattern, at least one special code can be provided, in particular in the interfacing region between two repeated patterns, to enable an identification of the individual patterns after step b). The special codes can be of a different colour with respect to the standard codes, or of any other kind of symbol which can be identified during image analysis. Thus it becomes possible to cover large surfaces without having to create very large patterns by repeating the one predetermined pattern and identifying them via their special code.

According to a preferred variant, the potential codes on the borders of the pattern (for border quadrilaterals) can be configured such that codes remain unique when at least two border regions abut against each other. More and more labels are used which are no longer attached to the object, but are just wrapped around the object wherein abutting or overlapping parts of the label are glued together and held in place by shrinking it onto the object. This use of labels facilitates recycling. Other types of labels, like sealing caps for wine bottles, also have overlapping parts. By keeping the code unique also in the overlapping or abutting regions, the risk of an erroneous interpretation is reduced.

Preferably, the step of matching can further comprise determining a confidence value in an identified code in one image as a function of the number of its correctly identified neighbour codes. Starting from the predetermined distribution of codes, it therefore becomes possible to discriminate between regions in the image which are easier to identify than regions, e.g. with strong shrinking, in which artefacts can occur. In case one code has been identified several times in one image within one pattern, the process can be configured such that only the one with the highest confidence, thus with most of its neighbours correctly identified, is taken into account. This step can be carried out either manually or automatically.

In this context, it is further preferred to only use codes for which in at least two images more than one, in particular all its neighbouring codes have been correctly identified to establish the 3D surface model base on matching. This improves the accuracy of the 3D surface model.

According to a preferred embodiment, the 3D surface model building step can further comprise determining at least one passage matrix between at least two images, comprising a rotational and translational part corresponding to the difference between their two points of view. Thus the method can be carried out without computing the points of view, e.g. the global positions of a camera, with respect to each other.

The second object of the invention is also achieved with the method according to claim 14. The features of this claim can furthermore form an advantageous embodiment of the method according to claim 1. Accordingly the method comprises a further step of determining a bijective or reverse relation (transformation) between a 2D space represented by the pattern before plastic deformation and a 3D space represented by the 3D surface model after plastic deformation. Indeed, the 3D surface model building step gives a relation between the 3D surface points and their 2D coordinates, in the pattern of codes, as all the vertices of the 3D surface model are linked with the 2D grid of the pattern of codes. As the determined 3D surface model has undergone the plastic deformation, the relations between that 2D pattern, e.g. the grid of polygons, and the 3D grid of vertices represent the deformation process.

Preferably, the method can further comprise the steps of projecting a 2D initial grid, in particular a 2D regular grid, onto the 3D surface model and determining a 2D resultant grid in the 2D space based on the bijective relation. In fact, the resultant grid corresponds to the initial 2D grid deformed by the inverse of the original deformation in step b) of claim 1. Thanks to the mapping between the initial and the resultant 2D grid, at least one pre-deformed label apply on the object can be compute through at least one particular point of view around the 3D surface model, by use of that mapping called grid mapping. If the starting grid is regular then the resultant grid shows how the labels could be pre-deformed, that grid is a pre-deformed grid. Whereas a regular grid is preferred as it facilitates analysis, any other kind of grid can also be used according to the invention.

According to a variant, the method can further comprise a step of determining a projection of the 2D regular grid from one point of view or a combination of points of view on the 3D surface model, using a point of view different from those of the images of step c). The projection can be an orthographic or perspective projection and is again based on the bijective relation without that one has to stick to the images taken by the camera.

Preferably, the method can further comprise a step of projecting one or several 2D regular grids from one or several point of views on a part or the complete surface of the 3D surface model. Once the 3D surface model established and for example output on a display, the user of the system can choose independently of the images taken, the point of view/s which is/are the most important for the product. Using the bijective relation it is then possible to determine the inverse deformation to obtain the 2D resultant grid for this kind of grid/s. By calculating the inverse deformation for different views, the predeformation of a label can be optimized, in particular to different points of view, e.g. the front and backside of a packaging.

According to a preferred embodiment, the method can further comprise a step of using a 2D warping method for determining the necessary predeformation of the visual representation based on the 2D regular grid and its transformation into the 2D space via the 3D space of the 3D surface model. It is a particular advantage of this invention, that base on the two grids, the initial and the resultant grid, it is possible to use standard image treatment routines, e.g. embedded into standard graphic software packages, to determine the predeformation necessary to obtain an optimized final product.

Advantageously, the method can further comprise a step of identifying surface regions of the 3D surface model whose normal vectors have an angular difference with the projection angle of view larger than an angular threshold, in particular 80°. In the chosen point of view to get the pre-deformed grid, such regions have to be correctly treated to avoid that the pre-deforming is exaggerated. By identifying these regions, artefact can be taken into account, e.g. by manually adapting the pre-deformation during the distortion correction.

According to a preferred embodiment, the method can further comprise a step of providing the pattern on the support on an object between step a) and b) and deforming the pattern on the support together with the object. Thus the deformation is carried out by the same process as for the final object (product), so that the analysis is precise.

The invention furthermore relates to a computer program product, comprising one or more computer readable media having computer-executable instructions for performing the steps of: a) receiving image data of at least two images of a support with a pattern comprising a distribution of unique codes which was plastically deformed and wherein the images represent two different points of view, and b) determining a 3D surface model based on the matching of at least one code in the at least two images. Thus with this computer program product and an imaging device, e.g. a camera, all the advantageous effects as described above can be achieved. The computer program product can comprise further process steps like described above.

Preferably, the computer program product can further comprise instructions for performing the additional method steps described above in relation to exploiting the 3D surface model, in particular in determining the bijective relation.

The invention furthermore relates to a system comprising a data treatment unit configured to carry out the method according to one of the above described methods. With this system, all the advantages as described above can be achieved.

Figure 1B:
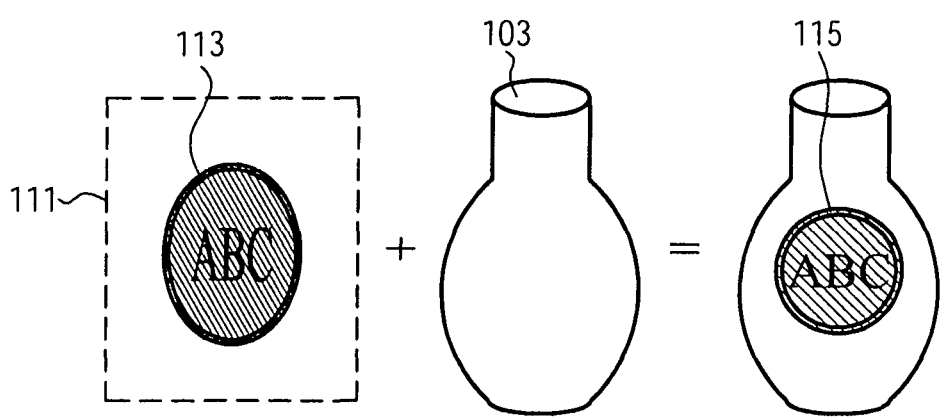
Figure 2:
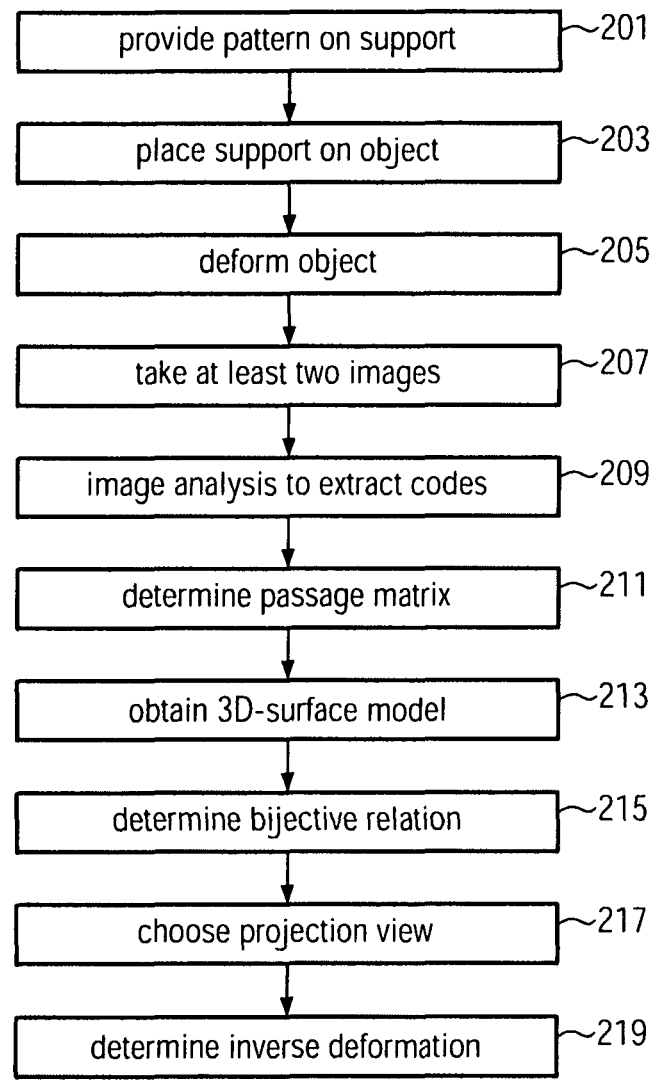
Figure 4A:
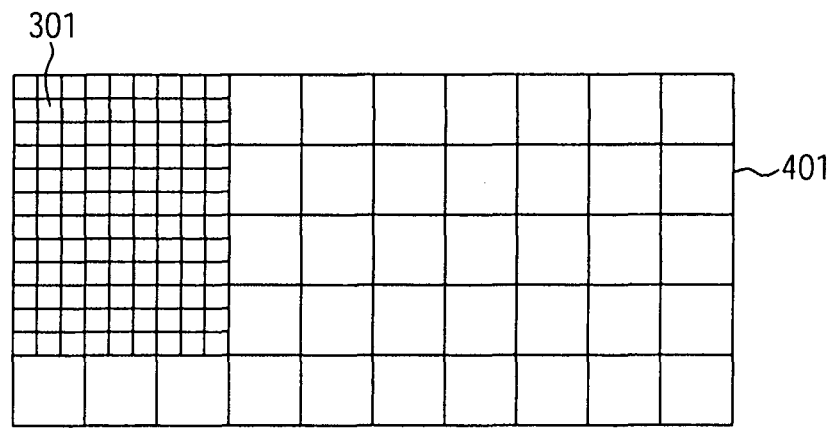
Figure 4B:
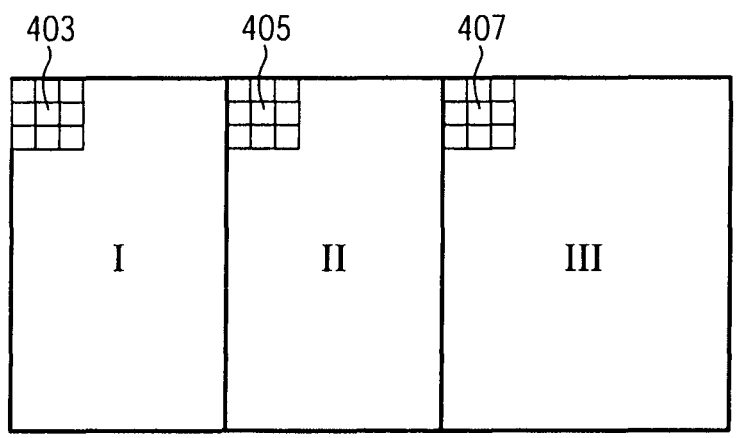
Figure 5A:
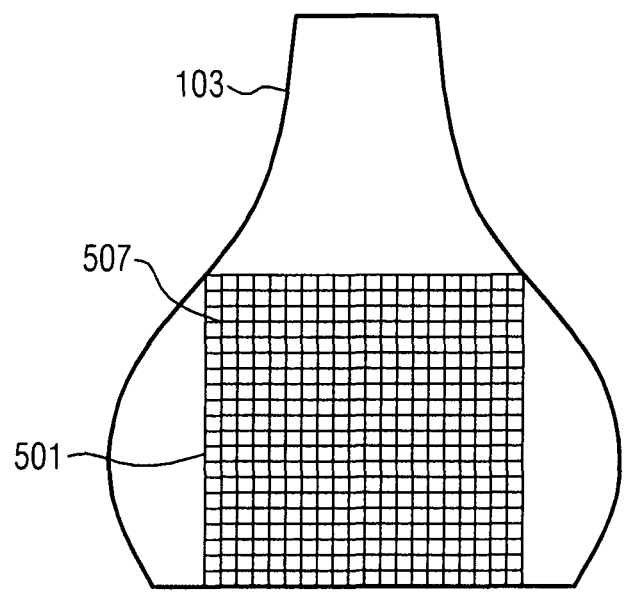
Figure 5B:
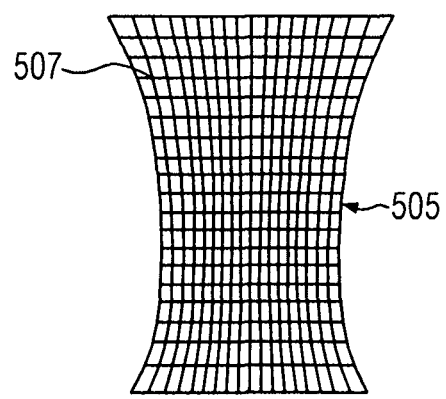
Figure 5C:
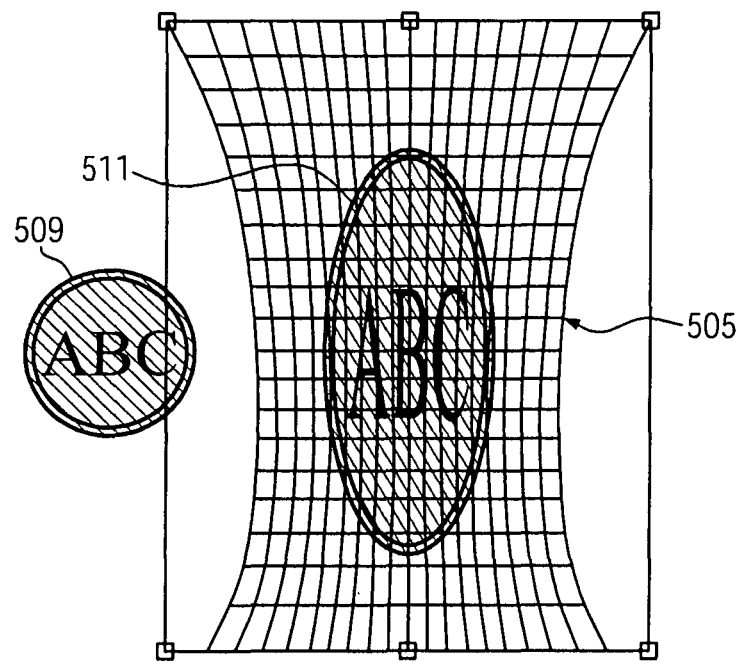
Figure 5D:
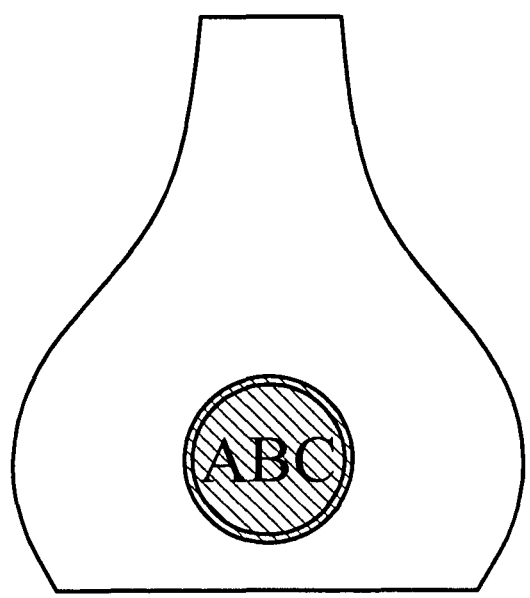
Figure 5E:
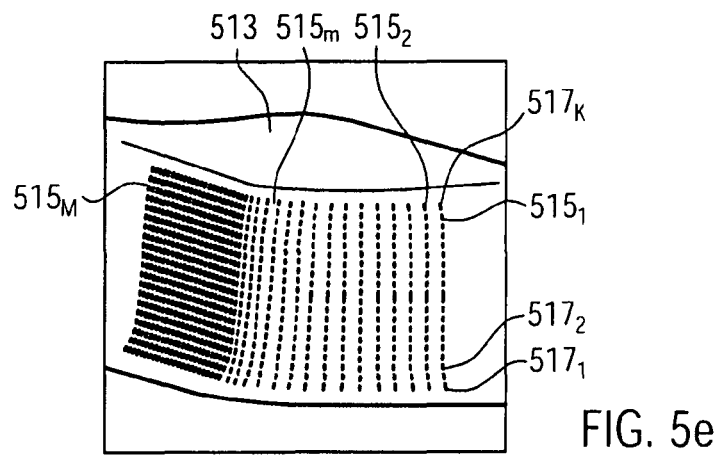
Figure 5F:
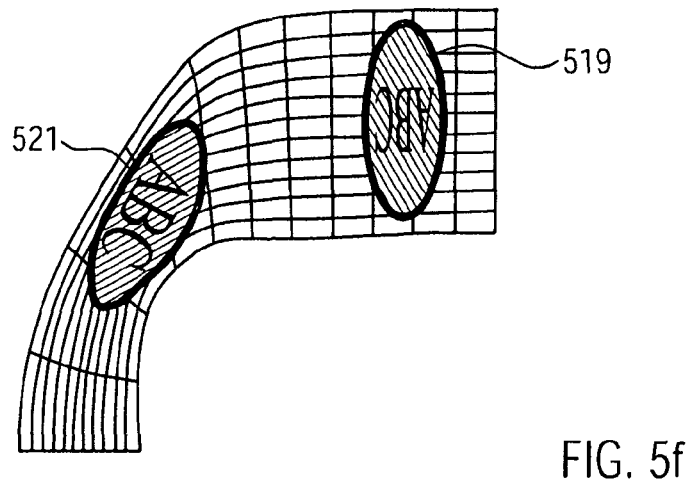
Figure 5G:
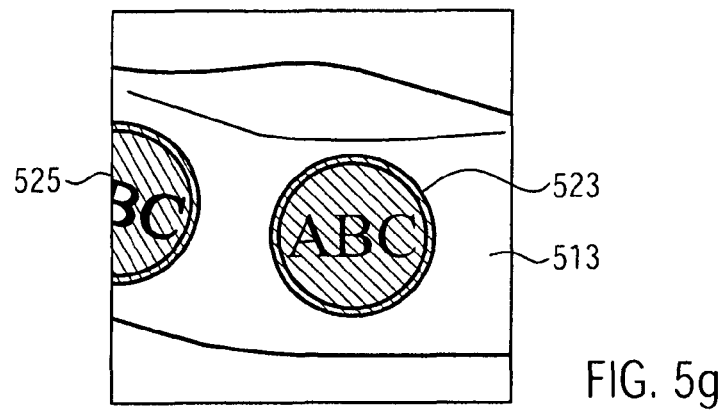
Figure 6:
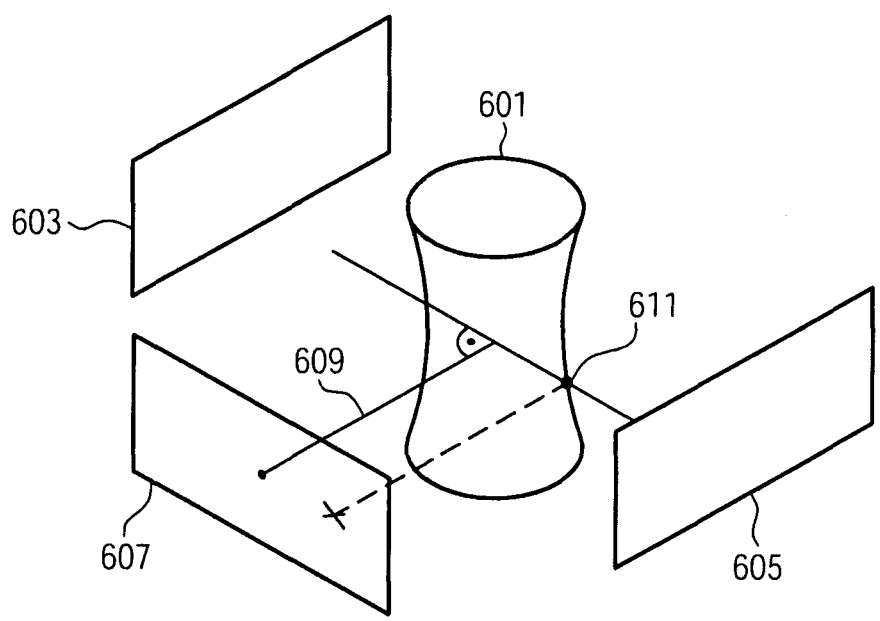
Figure 7A:
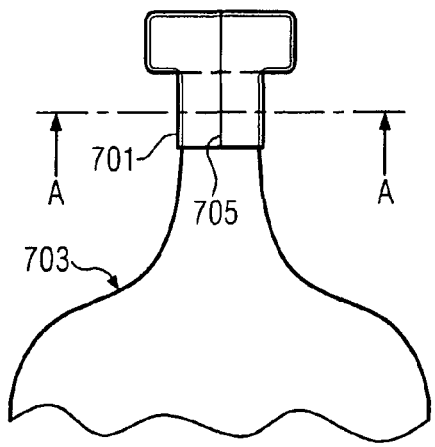
Figure 7B:
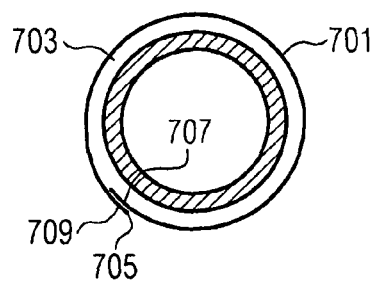
Figure 7C:
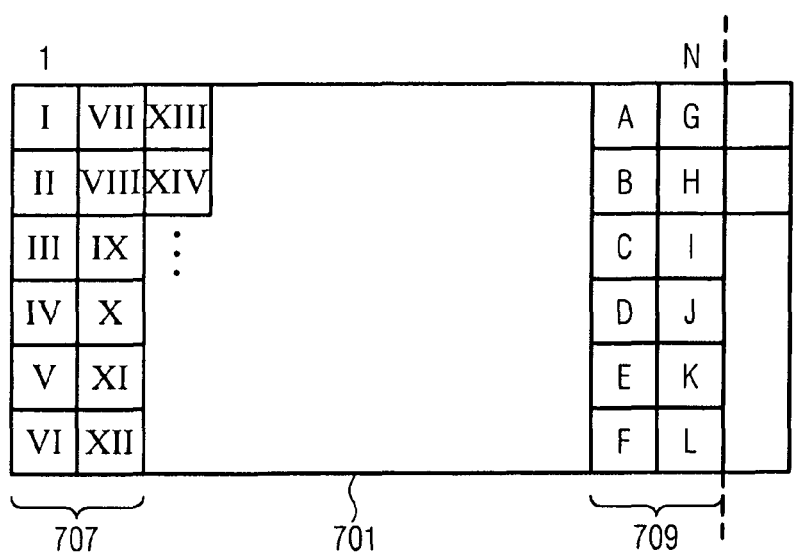

In the following embodiments, advantageous features of the invention will be described in detail in conjunction with the accompanying figures:

FIGS. 1a and 1b illustrate the effect of the deformation of a visual representation and the advantageous effects of pre-deforming visual representation, FIG. 2 is a flowchart illustrating a first embodiment of the method for adapting a visual representation which subsequently is subjected to a deformation, FIGS. 3a to 3c illustrate a pattern with a unique code used in the method illustrated in FIG. 2, FIGS. 4a and 4b illustrate three alternative ways of providing a pattern with a unique distribution of codes on a support, FIGS. 5a to 5g illustrate the steps to carry out a pre-deformation according to the invention, FIG. 6 illustrates a second embodiment of the invention dealing with unwanted artefacts on the 3D surface model, and FIGS. 7a to 7c illustrate a third embodiment of the invention applied to overlapping visual representations.

FIG. 1a illustrates a visual representation 101, here a label, and a three-dimensional object 103, here a can. A visual representation can comprise a drawing and/or an image and/or text and/or a photograph etc. or a combination thereof. The object can be any object on which a visual representation is to be placed.

In this embodiment, the visual representation 101 is provided on a support, e.g. printed on a shrink foil, which is fixed to the object 103 and is then shrunk onto the object 103, typically using heat, to obtain the final product 105 with the label 107 shrunk onto the object 103. Fixing is typically achieved by attaching using an adhesive or by wrapping around and gluing overlapping parts of the foil to each other, but any other suitable process deforming the visual representation can be applied. Instead of a shrink foil, any suitable other support like a stretch or shrink sleeve could be used as support or any forming process like thermoforming, embossing, stamping, blow moulding or vacuum-squeeze moulding could find its application. Here deformation relates to any process that changes the angular and/or length properties of the visual representation due, for example, to retraction or expansion of the surface of an object.

As can be seen on the right hand side of FIG. 1a, an unwanted deformation of the label 107 is observed due to the irregular form of object 103. Here, the originally round logo 109 is now stretched out into an irregular approximately elliptic form.

The deformations negatively influence the appearance of a product and can, furthermore, have an impact on the image of a company or the trademark under which the product is marketed.

The problem of deformation can be overcome by pre-deforming the visual representation 101, like illustrated on the left hand side of FIG. 1b. In fact, the label 111 is deformed such that the special geometric properties of the object 103 are taken into account. In this case, this leads to a squeezing of the logo 113, like shown on the left hand side of FIG. 1b. When applying the pre-deformed label 111 on the object 103 and carrying out the shrinking step, the desired round shaped logo 115 is obtained on the final product.

In the following, the first embodiment of the inventive method for adapting a visual representation which is subsequently subjected to a deformation will be explained in conjunction with FIGS. 2 and 3.

This method comprises the following steps: providing a pattern with a distribution of unique codes on a support (Step 201), placing that support with the pattern on an object (Step 203), deforming the object using the same production process as for the final product (Step 205), taking at least two images of the deformed object (Step 207), through image analysis extracting codes out of the images (Step 209), estimating a passage matrix between the points of view of the two images (Step 211), getting a 3-D model of the deformed object from the extracted codes of those images (Step 213), determining a bijective relation between the non deformed 2D space and the 3D space represented by the deformed object (step 215), choosing a point of view which is a virtual projection view of that 3-D model (Step 217), and calculating its corresponding inverse deformation (Step 219) to have the pre-deformed data need to correct a label, like label 111 of FIG. 1B. Steps 209 to 219 can be carried out by a computer program product.

Compared to prior art systems which either had to develop a numerical model of the deformation process itself, or used sophisticated hardware, like a 3-D scanner, to determine deformation properties like described above, the inventive method is based on the finding that using an intelligent pattern with a distribution of unique codes provides sufficient information. Starting from only two images taken, the deformed pattern on the object is obtained from two different angles of view and provides the necessary data to make a 3-D model from which, in turn, an inverse deformation can be determined which is then used to pre-deform the visual representation 101.

Compared to the prior art systems and methods, the inventive method is therefore simple to carry out and only needs a camera and computer. Furthermore such a system is mobile.

FIGS. 3a and 3b illustrate a portion of a pattern 301 according to the invention with a distribution of unique codes $303_i$, with i=1, 2, ..., n, N, with N being the amount of codes in a given pattern (of which pattern 301 is only a part), and which finds its application in Step 201 (and step (a) of claim 1). Here, the term "unique" means that within the pattern, one particular code only appears once.

In this embodiment, five different colours are used as symbols for the codes $303_i$. The different colours are indicated by different hatchings. However, any other suitable kind of symbols, like graphical symbols or textures could also find their application instead of colours or in addition. Furthermore, the number of different colours is not limited to five and could be more or less, as a function of the amount of unique codes necessary for the pattern 301 and the computing power available. In FIG. 3a, The same portion of pattern 301 is represented in hatchings on FIG. 3a and in numbers on FIG. 3b with one number representing one colour.

The portion of the pattern 301 is built up of a grid of n polygons (here n=30, but n could of course be any number). In this embodiment, quadrilaterals are used as polygons. Instead, other kinds of polygons, like triangles, could also be used in the pattern 301. Polygons have the advantage, that under deformation they can be approximated again by polygons. Thus a quadrilateral can be approximated by a quadrilateral and its corners or centre can be automatically determined by image analysis algorithms.

In this embodiment, one code $303_i$ is associated with one quadrilateral. The code $303_i$ is further defined by its own colour and the colours of the connected neighbouring quadrilaterals. By using the neighbouring colours to define one code, it becomes possible to greatly enhance the amount of unique codes.

FIG. 3b illustrates this situation. The code of the centre quadrilateral $303_7$ is defined by its own colour, here represented by the number 3 and the colours of its connected quadrilaterals illustrated by the frame 305. The connected quadrilaterals of code $303_7$ are thus its eight neighbour quadrilaterals 305, adjacent to code $303_7$. Instead of using the eight adjacent quadrilaterals, one could also use the four nearest neighbours $303_2$, $303_6$, $303_8$ and $303_{12}$. According to a further variant one could also use the twenty four nearest neighbouring quadrilaterals.

In this embodiment, the quadrilaterals of the codes $303_i$ are separated by the intersection lines 307 of the grid. In this embodiment, the intersection lines 307 have a different colour compared to the ones used for the quadrilaterals of the codes $303_i$ to facilitate the image analysis.

In this variant, the five colours are chosen from the CYMK colour space, which is the one usually used in printing. To facilitate the image analysis, the chosen colours are the most uniformly distributed among the 360 degrees in the colour space (e.g. Lab.CIE or HSL can be used). Nevertheless, any other suitable colour space can be used to define the five colours.

In this embodiment, the uniqueness of each code $303_i$ also relates to rotationally invariants. FIG. 3c illustrates the eight rotationally invariants of code $303_8$, in the entire pattern (of which pattern 301 is only a part), only one of the eight representations shown in FIG. 3c, will be used. This has the advantage, that the image analysis is facilitated. Indeed, one does not have to worry about the exact positioning of the cameras used to take images in step 207.

Whereas in principle no limit is put on the amount of different colours, the use of six different colours, one colour for the intersection lines and the five others for quadrilaterals is sufficient to build a pattern with a larger number of unique codes. With a code $303_i$ being defined by five colours and nine quadrilaterals (see 307), 244.140 (5^9/8) different codes exist and for instance a pattern can be built with 250*250 codes. However, more or fewer colours and more or less neighbours (4 or even 24) can be used to make the codes if a larger or smaller pattern is necessary for the desired application.

To build up a pattern 301 according to the invention, one starts with an empty grid of quadrilaterals. That grid then has to be filled with colours of the model. The first code $303_7$ is established by randomly choosing a colour for the centre quadrilateral $303_7$ and the eight nearest neighbours 307. For the next code $303_8$, three new colours need to be found for the three quadrilaterals of frame 309, such that the new code and any one of its rotated versions (see FIG. 3c) does not yet exist in the pattern. This step is then repeated with the next neighbour quadrilaterals and so on. The information of each code $303_i$ already in the pattern is stored and used to judge, whether a code or any one of its rotationally invariants already exists in the pattern.

Once the pattern 301 with a distribution of unique codes $303_i$ is established, it can be used in any application of the inventive method. Thereto, the pattern 301 is provided, for example by printing, on a support 401 out of the same material and with the same dimensions as the one on which the visual representation (for example label 101) is printed (Step 203). The pattern 301 covers the surface 401 of the support, like illustrated in FIG. 4a. If the size of the pattern 301 is larger than the surface of the support 401, one can only use a part of the pattern.

If a larger pattern 301 is necessary, either the number of different colours can be increased or, according to a variant other symbols, like geometric ones (+, −, o, x, *) can be added to each coloured quadrilateral. Then the number of possible codes allows to build large pattern for instance with 1000*1000 codes or more. Such a pattern can cover bigger supports for a given product or it can increase the precision of the 3D surface model. It is also possible to scale the pattern 301. With a scaling up or down of the pattern it is also possible to adapt the precision of the process. In fact, the precision depends on the fact that after deformation (shrinking or extension) of the pattern, codes can still be identified during image analysis. Thus, depending on the resolution of the camera used, one can choose the size of the grid. On the other side, also the printing process of providing the pattern on the support might, however, be limiting with respect to the resolution.

In case the pattern is not large enough, it could also be duplicated like illustrated in FIG. 4b. In this case, it becomes necessary to be able to clearly identify the position of each one of the duplicated regions (I-III). This can, for example, be done by providing at least one special code 403, 405, 407 per region which is not present in the other regions. Upon identification of that at least one special code, the algorithms used to analyse the images can identify the region.

The next step 205 of the process consists in deforming the support such that the support fits on the object like illustrated in FIGS. 1a and 1b or deforming the support together with the object 103. Here the same process as for the final product is applied. During heat shrinking, like described above, a plastic deformation of the support and the pattern is achieved. Nevertheless, the inventive method is not limited to heat shrinking and any deforming processes during which length and/or angular dimensions change, falls under the invention.

The next step 207 then consists in taking at least two images of the deformed surface. To do so a camera, in particular a numeric camera of CCD or CMOS type, is used. Like already mentioned above, at least two images have to be taken to be able to establish a 3D surface model. With more images the precision of the model can be improved or a larger covering surface of the object 103 can be obtained. Apart from the number of images, the only additional requirement concerning the images is that there is sufficient light to take the images and that they are in focus so that the codes 303$_i$ can be extracted. Thus, there is no need for a special illumination of the object or a special background scene in which the object is placed. There is also no need for a special calibration. The calibration process only serves to estimate the internal camera parameters. The calibration is carried out once per camera and those internal parameters are then used in the system. The calibration method is based on different images of a special and known target, for instance the pattern 301 put on a plane.

In the next step 209, the images taken are numerically analysed using state of the art algorithms (decomposition RGB in lab-CIE or HSL, contour extraction). During image analysis, a quadrilateral of the pattern 301 is determined by analysing the positions of its corners and/or its centre and its main colour. To analyse the colour it is also possible to take advantage of the screening of the image, which provides a typical texture due to the printing process. Once for a given code, e.g. 303$_7$, the nine colours (see frame 305) are extracted, the code can be identified and via its neighbours a confidence value is computed.

To limit the errors in code extraction, an additional verification step can be added according to a variant of the first embodiment. In case one code is extracted several times in the same image, the method is carried out such that only the one with the highest confidence value is kept.

During the verification step, two confidence values are computed for each code 303$_i$, one is the building confidence value link to the code building process and the other, a neighbouring confidence value relates to the probability that an identified code is correctly identified with respect to its neighbouring codes.

The correctness of the code extraction is not completely guaranteed, as errors can occur during the determination of the symbols. Indeed, if for one quadrilateral, one colour of one of its neighbouring quadrilaterals is not correctly identified, then the identified code is also wrong. Nevertheless, that bad code could be found in the pattern 301 at another position and would become validated. A verification step of a code with respect to the neighbouring codes gives the possibility to eliminate a code which has been determined wrongly.

As already mentioned above, a code is linked with colours of its neighbouring quadrilaterals and also with its neighbouring codes. If for one code it was possible to identify all colours of its neighbouring quadrilaterals, this code has a higher building confidence than a code for which only some colours of the neighbouring quadrilaterals have been identified. Nevertheless, if one or more neighbouring quadrilaterals are missing, a code can still be built thanks to the identification of its neighbouring codes but its building confidence is lower.

For example, one can give a building confidence value "k" of 1 for a code for which not all neighbouring quadrilaterals have been identified, but for which an identification became possible due to correctly identified neighbouring codes, for example more than three neighbouring codes. A building confidence value of 2 can be accorded for a code which has all its neighbouring quadrilaterals, whereas a building confidence value of 0 is provided in case that e.g. less than three nearest neighbouring codes have been identified.

A neighbouring confidence in one code then relates to the sum of the building confidence values $k_i$ of its neighbouring codes. For $k_i$ neighbouring possible codes that confidence is $$\sum_{i=1}^{k} conf(k_i).$$

Thus in the embodiment of FIG. 3, when summing up the building confidence values for all eight neighbouring codes, one can thus attribute a neighbouring confidence value for a given code varying from 0 to 16.

Following the numerical extraction of the codes in each image, the data is used to establish a 3-D surface model based on 3D triangulation. To be able to use a 3D triangulation of the codes using the at least two images, first of all the camera position associated with each image needs to be known with respect to the object. This is done during step 211.

To keep the method simple to carry out, it is preferred to use the images themselves to determine the camera positions with respect to each other and with respect to the object. According to an alternative, the exact camera positions could, however, also be determined using a calibrated positioning tool with which the camera positions, as well as the object position, can be determined with respect to each other beforehand.

One image position can be defined by a rotational matrix and a translational vector which actually puts the camera realising that image in a 3-D environment. A passage matrix, comprising a rotation and a translation, then allows positioning a second image with respect to the first one.

According to the invention, the passage matrix between two images is obtained by matching corresponding codes in the two images. This can be done based on the distribution of the unique codes 303$_i$ in the pattern 301. The passage matrix is a 3×3 matrix and has eight parameters which need to be established. Thus, having identified at least eight corresponding codes in the two images, it becomes possible to determine the passage matrix.

In case more than two images have been taken, it is enough to identify at least one passage matrix between each image and at least one of the others, it is not mandatory to establish all the passage matrices between all possible combinations of images. Each matched code between two images provides an equation which can then be exploited to establish the passage matrix between those two images.

As the estimation of the passage matrix is important to obtain a precise 3-D model of the deformed object, preferably only codes with a maximum confidence value, e.g. confidence value of 16 in the above described example, are used in this step.

Having matched the necessary number of codes between the at least two images and having determined the passage matrix between the different points of view, the next step 213 consists in determining the 3-D surface model. To do so, a triangulation process is carried out. The triangulation of one code provides the coordinates in the 3D space (x, y, z) and is based on the position of the code in the two images for which the positions relative to each other have been previously defined with the passage matrix. This technique comprises determining for each one of the points in 2-D (corresponding to the centre of the quadrilateral corresponding to the central point of a symbol of a code 303$_i$), a 3-D line which passes via this point in 3-D and the centre of the camera.

The positioning of the corresponding point in 3-D is then obtained by intersecting the two lines. In case no intersection is achieved, the method is configured to take the point in 3-D which is the closest to both lines. To improve the resolution, it is of course advantageous to use more than two images so that more than two lines are determined from which the 3D position can be obtained.

Due to the fact that the codes $303_i$ in the pattern 301 are connected to each other in a unique way, it is also possible to estimate the position of codes which have not been identified in the images or which have been rejected due to a low confidence value. If, for example, one code is missing but it eight nearest neighbouring codes have been identified, the mean value of the position of the eight corresponding 3-D coordinates provides a position in 3D for the lacking one. If only some of the neighbouring codes were identified, it is still possible to carry out its estimation. For example one can take the average position of four codes, arranged in a cross like manner with respect to the lacking code.

Once the 3D surface model of the deformed pattern 301 established, the next step 215 consist in determining a bijective relation between a 2D space represented by the pattern 301 before plastic deformation and a 3D space represented by the 3D surface model after plastic deformation. The bijective relation corresponds to a mathematical description that allows to pass from the deformed 3D space into the 2D space and vice versa.

The next process step 217 consists in choosing a point of view of the 3-D model corresponding to certain point of view with respect to the object 103 and based on which an inverse deformation can then be determined. The inverse deformation uses the bijective relation and provides the information necessary to pre-deform the visual representation. According to the invention, the inverse deformation is calculated from a point of view chosen by the user, and which does not have to correspond to one of the points of views of the images taken of the deformed object.

In packaging of a product, some points of views of a product, in particular the ones showing the name of the product and/or the trademark of the manufacturer are privileged. Any aesthetic deficiency in this particular point of view can harm. Other views are less important. Therefore, the inverse deformation shall be calculated starting from such a privileged position which is also called the facing position.

Once the privileged position chosen, a 2D grid, e.g. a 2D regular grid, is projected onto the 3D surface model and a 2D resultant grid is calculated in the 2D space based on the bijective relation established during step 215. This situation is illustrated in FIG. 5a. It illustrates the chosen privileged view of the deformed object 103 (see FIG. 1a) and a grid of 20*20 columns and lines of the 2D regular initial grid 501. The view illustrated in FIG. 5a is a projection of the 3D surface model onto the plane of the chosen angle of view.

Here, the size of the grid corresponds only to a possible example. Depending on the size of the label 109 and the desired resolution more or less column and lines can be taken. Using the bijective relation the projected initial grid is then back transferred into the 2D space, the result of which is illustrated in FIG. 5b. In the 2D space the regular 2D grid 501 is now deformed and forms the 2D resultant grid 505. One now has for every crossing point of grid 501 a corresponding position in the 2D resultant grid 505, see e.g. crossing point 507 in FIGS. 5a and 5b.

Next, the inverse deformation (step 219) is computed using the positions of the codes in the projected direction showing the deformation information and the known position of the codes in the original pattern. The process underlying this calculus is a standard warping process. This is possible as actually the properties of the initial regular grid and the resultant grid match the requirements of 2D warping. To obtain the pre-deformed label 113 like shown in FIG. 1B, one then has to combine the original label 1 with the data from the inverse deformation calculation (Step 219). The results of this step are illustrated in FIGS. 5c and 5d.

FIG. 5c illustrates on the left side the shape of the undeformed logo 509 (see also 109 in FIG. 1a). and the result of its warping into the resultant grid 505 leads to the pre-deformed logo 511 (see also 113 in FIG. 1b).

FIG. 5d then illustrates the effect of the deformation process on the pre-deformed logo 511 and which shows the desired round shape even after the deformation process.

According to a variant, it is also possible to use several 2D regular grids from several points of views on a part or the complete surface of the 3D surface model. In fact, the several points of views represent a kind of trajectory on the object 103. In this case one can for example also take into the backside of a product.

In this variant, a initial grid of a predetermined size and with a predetermined amount of columns and lines is projected onto the 3D surface model for each point of view on the trajectory. Then using the same algorithms as already described above with respect to step 219, the predeformation is determined base on the bijective relation established during step 215. It only has to be ensured that no overlapping occurs between the several initial grid projections.

In one special embodiment of this variant, one does not use a 2D grid but for each point on the trajectory only a line with a predetermined amount of reference points is projected onto the 3D surface model. This situation is illustrated in FIGS. 5e to 5g.

FIG. 5e illustrates a part of a can 513 and a series of lines 515, j=1, 2, ..., m, ..., M with reference points $517_k$, k=1, 2, ..., K.

FIG. 5f illustrates the result of the warping step and shows the effect of the pre-deformation on the logo 519 and 521 (see also logo 109 in FIG. 1a).

Finally, FIG. 5g shows the result after applying the visual representation of FIG. 5f on the object 513 after deformation. Again, the desired round shape of the logo 523 and 525 can be observed.

According to a second embodiment, an additional data treatment step is carried out between steps 215 and 217 to take into account artefacts which can occur when a surface region in the 3-D model has an angular difference between its surface normal vector and the surface normal vector of the projection image plane which is larger than a predetermined angle, in particular larger than 80°.

This situation is illustrated in FIG. 6, illustrating an object 601 of which two images have been taken from two different points of view 603 and 605 and wherein the protection angle of view 607 is positioned such that the surface normal 609 of the projection image 607 forms a large angle, nearly 90° with the surface normal of region 611.

In the projection 607, the neighbouring codes in the surface region 611 are very close to each other. As a consequence, the warping transformation will lead to a large pre-deformation in the corresponding label 111. This would not cause a problem in the case object 601 would only be looked at from the angle of view 607. However, in reality an object is looked at from an angular range and not form only one view. Thus under points of view other than the one corresponding to 607 would show an exaggerated deformation.

To limit the impact of strong deformations in region 611 on the final pre-deformation process, the second embodiment comprises an additional step of identifying such areas (either manually or automatically) and correcting the pre-deformation grid by taking the pre-deformation values of a point corresponding to the angular threshold value, e.g. 80°.

FIG. 7a illustrates a third embodiment of the inventive method which can be combined with the first two embodiments independently or in combination. The third embodiment deals with artefacts which can occur when the visual representation on the support in one region overlaps or abuts with another region of the visual representation in the final product. This situation occurs, for example, for sealing caps 701 of bottles 703 which are shrunk onto the cork. In FIG. 7*a* reference numeral 705 indicates the visible intersection line of the two overlapping ends of cap 701. FIG. 7*b* is a cut view along line A-A of FIG. 7*a*. It shows the bottle neck 703, the cap 701 with overlapping regions 707 and 709. This situation also occurs when one does not want to attach a label to an underlying object which occurs in the case of labelling of PET bottles to facilitate the recycling of the plastics.

When applying the process to this kind of product, there will be abutting or overlapping of the pattern of unique codes such that in the overlapped region 705 new codes would be identified which are present or not in the original pattern, e.g. pattern 301, and they can therefore not be attached to a 2D position on the original pattern, which could lead to an erroneous pre-deforming result. To overcome this problem, the third embodiment of the invention proposes to arrange the codes in the border region such that even if two regions of the pattern abut against each other, the uniqueness of each code is still guaranteed (indicated by using roman numbers on the left side 707 and letters on the right side 709. As a result, boarder regions can be identified by the uniqueness of codes even in the boarder region. As a consequence also deformations in overlapping regions can be dealt with, such that even in this region pre-deformation data can be obtained from the method.

The invention claimed is:

1. A computer implemented method comprising the steps of:
  a) providing a pattern on a support, wherein the pattern comprises a distribution of codes which are arranged such that each code in the pattern is unique,
  b) deforming, plastically, the support with the pattern,
  c) taking at least two images of the plastically deformed support under different angles of view, and
  d) determining a 3D surface model of the plastically deformed support based on the matching of at least one code in the pattern in the at least two images.

2. The method according to claim 1, wherein the pattern comprises a grid of quadrilateral polygons, and wherein one code is associated with one quadrilateral polygon.

3. The method according to claim 1, wherein one code comprises at least one symbol, wherein the symbol is at least one of a texture and a color.

4. The method according to claim 1, wherein each code comprises its symbol and the symbols of a predetermined number of neighboring codes.

5. The method according to claim 1, wherein each unique code is rotationally invariant.

6. The method according to claim 1, wherein the colors to build a code are chosen out of a predetermined number of colors.

7. The method according to claim 1, wherein intersection lines between the polygons have a color different to the one of the codes.

8. The method according to claim 1, wherein the pattern is a predetermined pattern and its wherein the size of the pattern is adapted to the size of the support by at least one of scaling, cutting, and repeating the pattern.

9. The method according to claim 8, wherein in case of repeating the pattern, at least one special code is provided to enable an identification of the individual patterns after step b).

10. The method according to claim 1, wherein the codes on the borders of the pattern are unique when at least two border regions abut against each other or overlap.

11. The method according to claim 1, wherein the step d) of matching further comprises building a confidence value for an identified code in one image as a function of the number of identified neighbouring neighboring codes.

12. The method according to claim 11, wherein the step d) of matching further comprises only using codes for which, in the at least two images, more than one neighbor code has been correctly identified.

13. The method according to claim 1, wherein the 3D surface model determining step further comprises determining at least one passage matrix between two images comprising a rotational and a translational part corresponding to the difference between the point of view of each image.

14. The method according to claim 1, further comprising a step of determining a bijective relation between a 2D space represented by the pattern before plastic deformation and a 3D space represented by the 3D surface model.

15. The method according to claim 14, further comprising the steps of projecting a 2D regular grid onto the 3D surface model and determining a 2D resultant grid in the 2D space based on the bijective relation using a point of view different from those of the images of step c).

16. The method according to claim 15, further comprising a step of projecting one or several 2D regular grids from one or several point of views on a part or the complete surface of the 3D surface model.

17. The method according to claim 14, further comprising a step of using a 2D warping method for determining the necessary predeformation of the visual representation based on the 2D regular grid and its transformation into the 2D space via the 3D space of the 3D surface model.

18. A computer program product, comprising one or more non-transitory computer readable media having computer-executable instructions that, when executed, cause an apparatus to perform the steps of:
  a) receiving image data of at least two images of a support with a pattern comprising a distribution of unique codes, and which was deformed, plastically, and wherein the images are taken from two different angles of view, and
  b) determining a 3D surface model based on the matching of at least one code of the pattern in the at least two images.

19. The computer program product according to claim 18, wherein the computer-executable instructions, when executed, further cause the apparatus to perform the step of:
  determining a bijective relation between a 2D space represented by the pattern before plastic deformation and a 3D space represented by the 3D surface model after plastic deformation.

20. A system comprising an imaging device and a data treatment unit configured to:
  a) provide a pattern on a support, wherein the pattern comprises a distribution of codes which are arranged such that each code in the pattern is unique;
  b) deform, plastically, the support with the pattern;
  c) take at least two images of the plastically deformed support under different angles of view; and
  d) determine a 3D surface model of the plastically deformed support based on the matching of at least one code in the pattern in the at least two images.

* * * * *

UNITED STATES PATENT AND TRADEMARK OFFICE
CERTIFICATE OF CORRECTION

PATENT NO. : 8,625,883 B2
APPLICATION NO. : 13/125179
DATED : January 7, 2014
INVENTOR(S) : Marre et al.

It is certified that error appears in the above-identified patent and that said Letters Patent is hereby corrected as shown below:

Title page,
Item (73) Assignee: "Quadrazis" should read --Quadraxis--.

In the claims:

Column 13,
Line 61, Claim 8, "predetermined pattern and its wherein" should read
--predetermined pattern and wherein--.

Column 14,
Line 7, Claim 11, "neighbouring neighboring codes" should read --neighboring codes--.

Signed and Sealed this
Thirteenth Day of May, 2014

Michelle K. Lee
*Deputy Director of the United States Patent and Trademark Office*

UNITED STATES PATENT AND TRADEMARK OFFICE
CERTIFICATE OF CORRECTION

PATENT NO.        : 8,625,883 B2
APPLICATION NO.   : 13/125179
DATED             : January 7, 2014
INVENTOR(S)       : Marre et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 242 days.

Signed and Sealed this
Twenty-second Day of September, 2015

Michelle K. Lee
*Director of the United States Patent and Trademark Office*